US005214590A

United States Patent [19]

Schnetzer

[11] Patent Number: 5,214,590

[45] Date of Patent: May 25, 1993

[54] METHOD FOR SPLITTING MARKER LINES AND RELATED METHOD FOR BITE-BY-BITE CUTTING OF SHEET MATERIAL

[75] Inventor: John F. Schnetzer, Bolton, Conn.

[73] Assignee: Gerber Garment Technology, Inc., Tolland, Conn.

[21] Appl. No.: 694,942

[22] Filed: May 2, 1991

[51] Int. Cl.⁵ .......................... G06F 15/46; B26D 5/30

[52] U.S. Cl. .................................... 364/474.13; 83/34; 83/49; 83/56; 83/76.6; 83/940; 364/474.09

[58] Field of Search ...................... 364/474.34, 474.09, 364/474.13; 83/34, 49, 56, 13, 76.1, 76.6, 76.7, 76.9, 936–941

[56] References Cited

U.S. PATENT DOCUMENTS

| | | | |
|---|---|---|---|
| 3,761,675 | 9/1983 | Mason et al. | 219/121.67 |
| 4,328,726 | 5/1982 | Pearl | 83/39 |
| 4,415,978 | 11/1983 | Craemer et al. | 364/474.13 X |
| 4,534,002 | 8/1985 | Urban | 364/474.13 |
| 4,740,668 | 4/1988 | Perez | 219/121.39 |
| 4,972,745 | 11/1990 | Bruder et al. | 83/422 |
| 5,042,338 | 8/1991 | Gerber | 83/56 X |

FOREIGN PATENT DOCUMENTS 2142970 2/1973 France .

*Primary Examiner*—Joseph Ruggiero

*Attorney, Agent, or Firm*—McCormick, Paulding & Huber

[57] ABSTRACT

In the bite-by-bite cutting of a length of sheet material split points for pattern pieces extending between adjacent bites are assigned to bite overlap regions containing sheet material capable of being cut at the cutting station either before or after a given advancement. A method is further given for optimally locating the split points within the bite overlap regions so as to best avoid problems caused by slit notches, V-notches, sharp corners or other discontinuities located close to the split points.

15 Claims, 7 Drawing Sheets

METHOD FOR SPLITTING MARKER LINES AND RELATED METHOD FOR BITE-BY-BITE CUTTING OF SHEET MATERIAL

FIELD OF THE INVENTION

This invention relates to the automated cutting of sheet material by an X-Y cutter at a cutting station in accordance with a marker a number of times longer than the length of the cutting station, with the sheet material being fed to the cutting station and being cut there one bite at a time, and deals more particularly with a method for determining the point at which a marker line extending from one bite to the next, and comprised of successive straight line segments, is split to accommodate the cutting of one portion of it while the one bite of the sheet material is at the cutting station and the cutting of the next portion of it while the next bite is at the cutting station.

BACKGROUND OF THE INVENTION

The method of this invention is one particularly useful in the automated cutting of pattern pieces from sheet material in the general way shown by U.S. patent application Ser. No. 07/571,077, filed Aug. 21, 1990, now U.S. Pat. No. 5,042,339, entitled "Method and Apparatus For Cutting Successive Segments of Sheet Material With Cut Continuation", and U.S. patent application Ser. No. 07/681,555, filed Apr. 5, 1991, now U.S. Pat. No. 5,134,911, entitled "Method for the Interrupted Cutting of a Line in Sheet Material", wherein the sheet material to be cut and the related cutting marker are of relatively long length and wherein the sheet material is cut by progressively moving one bite of it to a cutting station having a length a number of times shorter than that of the marker, cutting lines in such one bite of the sheet material while it is at the cutting station, moving the next adjacent bite of the work material to the cutting station, cutting lines in the next bite while it is at the cutting station, and repeating such movement of successive bites of the sheet material and the cutting of them at the cutting station until the entire marker has been cut. In the cutting of pattern pieces from sheet material by such bite-by-bite cutting it often occurs that a pattern piece will have a portion of it falling into one bite and another portion falling into an adjacent bite so that one part of the pattern piece is cut at one time while the involved bite is at the cutting station and another portion of it is cut at a later time while the adjacent bite is at the cutting station.

Where portions of a marker line are cut at different times, as for example in the above-described cutting of a pattern piece having portions falling into bites of sheet material cut at different times, it is, of course, necessary to define a split point for the line, that is a point at which the cutting of the line is automatically interrupted and then later resumed to allow an intervening advancement of the work material. In the past such split points have usually been straightforwardly taken as being the points at which a dividing line between two successive bites intersects marker lines passing between those two bites. The split points determined in this way are, however, often ones not optimal for splitting purposes due to the involved marker lines having discontinuities or other special features, such as slit notches, V-notches and sharp corners, located at or very close to them.

To inhibit the possibility of threads or other parts of the sheet material remaining uncut at the position of a line split, it is desirable to continue the cutting motion a little bit past a split point before withdrawing the cutting tool from cutting engagement with the sheet material and to thereafter restart the cutting procedure at a point spaced slightly before the split point. In doing this it may also be desirable to veer the cutting tool slightly away from the marker line when ending and starting cuts at a split point to achieve a definite crossing of cut paths assuring the avoidance of uncut threads, as explained in the aforementioned patent application Ser. No. 07,681,555. This however lengthens the zone of the split and thereby increases the possibility of such zone including features of the marker line, such as notches and sharp corners, which are preferably avoided.

The general object of this invention is therefore to provide a method for determining the optimum locations of points for the splitting of marker lines which pass between adjacent bites in the bite-by-bite cutting of sheet material, such optimum split point locations being ones which in comparison to all possible locations are best spaced away from notches, sharp corners and other similar features of the involved marker lines to eliminate or reduce the possibility of such features interfering with the efficiency and cleanness of the cutting process.

A further object of the invention is to provide a method for bite-by-bite two-dimensional cutting of sheet material using the aforementioned split point location determining method.

Further objects and advantages of the invention will be apparent from the following description of a preferred embodiment of the invention and from the accompanying drawings and claims.

SUMMARY OF THE INVENTION

The invention resides in a process for determining the point at which a marker line extending from one bite to an adjacent bite of sheet material, and comprised of successive straight line segments, is to be split for the purpose of cutting the marker line in the sheet material in a bite-by-bite cutting procedure wherein the length of work material advanced during each advancement is less than the length of the cutting station so that the material at the cutting station includes an overlap region which will also be at the cutting station after the next advancement. The marker data is inspected to identify a marker line passing through such an overlap region of the sheet material, and that overlap region is divided into a plurality of channels located at various places along the length of the overlap region and each extending transversely of the length direction of the marker. The number of straight line segments of the identified marker line contained at least in part in each of the channels is then determined to provide a line segment count for each channel. Then on the basis of this line segment count per channel one of the channels is selected and the split point is assigned to that portion of the identified line which passes through the selected channel.

The invention further resides in the channels into which an overlap region is divided being located adjacent to one another along the length of the overlap region, and still further resides in each of said channels for the purpose of counting the number of line segments it contains being widened by two widening zones each located adjacent to a respective one of its boundaries.

Where the identified marker line is one defining the closed periphery of a pattern piece so that it crosses the overlap region at least two times, the invention resides in either all of the crossings being treated in common or in each crossing being treated individually in the step of determining the number of marker line segments contained in each channel, in the step of selecting a channel based on the line segment count per channel, and in the step of assigning a line splitting to the selected channel.

The invention still further resides in a method for cutting sheet material using the above-described method for determining the locations of split points and in other more detailed steps and features mentioned in the appended claims.

DESCRIPTION OF THE PREFERRED EMBODIMENTS

The method of this invention is useful in the cutting of sheet material and is applicable to various different kinds of cutting tools and cutting machines. For example, the cutting tool used for performing the actual cutting operation may be a reciprocating knife, an ultrasonically vibrated knife, a rotatable knife, a laser beam or a water jet. The cutting machine of which the cutting tool is a part may also, for example, be one wherein the cutting tool is moved either semi-automatically or automatically along lines of cut by a computer implemented control system using instructions derived from a marker providing a set of data describing in X and Y coordinates the shape and arrangement of pattern pieces wanted from the sheet material. That is, each pattern piece is defined by a marker line describing the periphery of the piece and any additional cuts such as slit notches and V-notches extending from the periphery, and the marker line in turn in the marker data is represented by the coordinates of a plurality of successive points to be connected by straight line segments.

Figure 1:
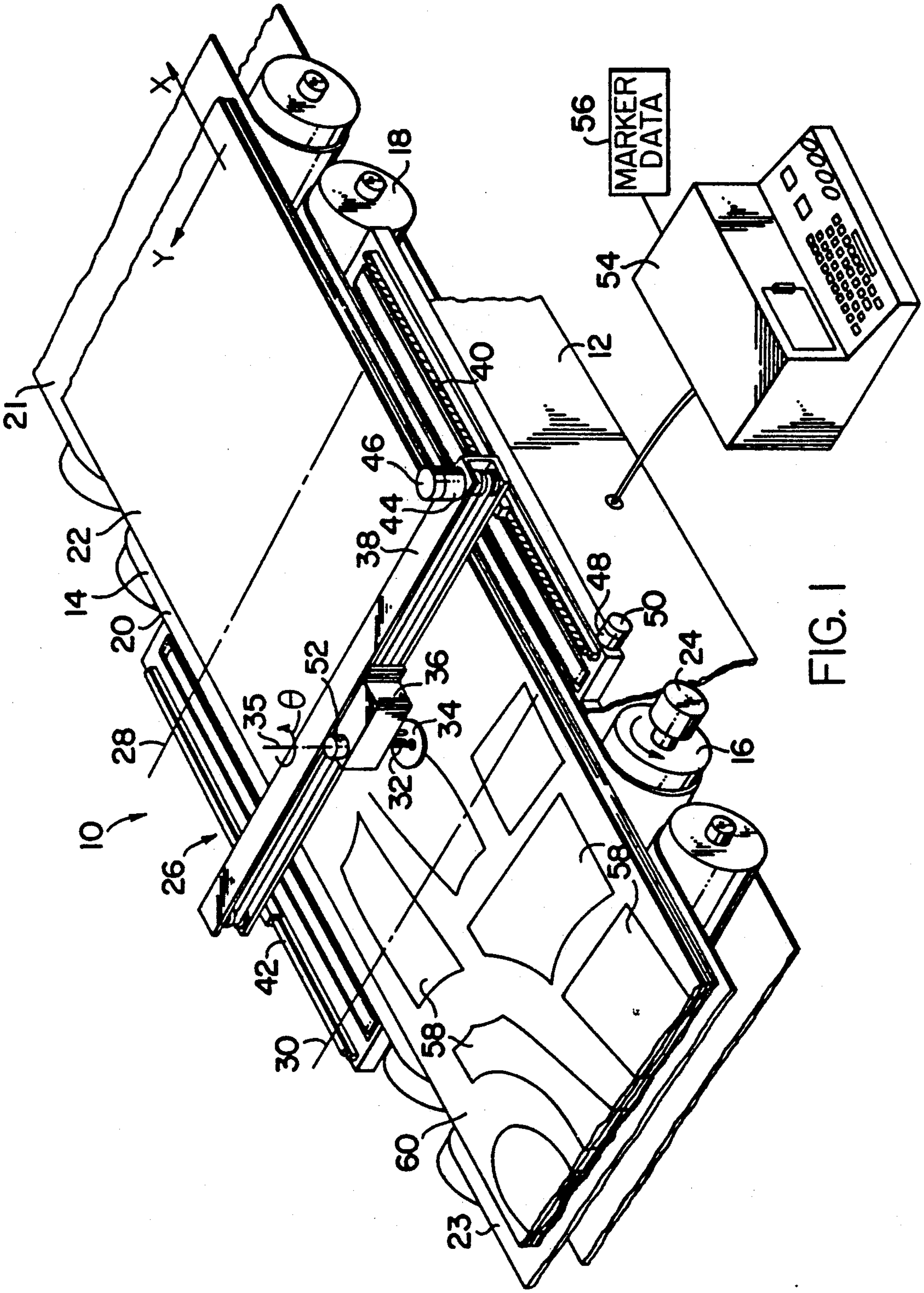
FIG. 1 is a perspective, somewhat schematic view of a cutting machine used in practicing the present invention.

Referring to FIG. 1, the invention is shown and described herein as carried out by an automatically controlled cutting machine 10 having a cutting station 26 of shorter length than the material and marker to be cut and having a conveyor for supporting the work material at the cutting station and for moving it lengthwise relative to the frame of the machine to bring successive bites of the material to the cutting station. This machine 10 includes a stationary frame 12 and an endless belt-like conveyor member 14 trained about rolls 16 and 18. The conveyor member 14 may for example be of the type shown in U.S. Pat. No. 4,328,723 wherein the member is made up of a large number of transversely extending bristle block carrying grids or slats pivotally connected to one another and wherein the rolls 16 and 18 are of suitable sprocket-like shape for positive driving cooperation with the conveyor member. In any event, the conveyor member 14 provides, along its upper run, an upwardly facing supporting surface 20 for supporting work material 22 shown as a lay-up of a number of superimposed sheets of sheet material such as fabric for the making of garments. The forward roll 16 is powered by a drive motor 24 which rotates the roll in the counter-clockwise direction illustrated by the arrow to move the work material 22 along the illustrated X coordinate axis or toward the left as viewed in FIG. 1.

Various different means may be used with the machine 10 for assisting in bringing work material to and taking it from the cutting station 26. In the illustrated case of FIG. 1 these means include a feed conveyor 21 and a take-away conveyor 23 which may be of types well known in the art and which may be driven in unison with the conveyor member 14. In the alternative, the illustrated conveyor member 14 may be lengthened at either or both ends of the machine 10 to take the place of the separate feed conveyor 21 and/or of the take-away conveyor 23.

The cutting station 26 has an effective length or range in the X coordinate direction defined by the limit lines 28 and 30, and has a width or range in the Y coordinate direction approximately equal to the width of the conveyor member 14. At the cutting station is a cutting tool 32 moveable in the X and Y coordinate directions over the full area of the cutting station to cut lines in the portion of the work material positioned then at the cutting station.

In the illustrated case the cutting tool 32 is a reciprocating knife cooperating with a presser foot 34 and reciprocated along a cutting axis 35 extending generally perpendicularly to the plane of the supporting surface 20. The cutting tool and the presser foot are carried by a cutter head 36, in turn carried by a main carriage 38 for movement relative thereto in the illustrated Y coordinate direction. The main carriage straddles the conveyor member 14 and at each of its opposite ends is supported by suitable longitudinally extending guides 40, 42 for movement in the X coordinate direction relative to the frame 12. A Y drive means including a motor 44 and a Y encoder 46 drives the cutter head 36 in the Y coordinate direction relative to the main carriage 38; and an X drive means including a motor 48 and an X encoder 50 drives the main carriage 38 in the X coordinate direction. A reciprocating motor (not shown) in the cutter head drives the cutting tool 32 in its reciprocating motion, and another motor (not shown) rotates the cutting tool, under control of the controller 50, in the theta direction about the axis 35 to keep the tool facing forwardly along the line of cut. A solenoid 52 carried by the cutter head 36 is operable to move the cutter head frame and therewith the cutting tool 32 and the presser foot 34, between a lowered position at which the cutter tool is in cutting engagement with the material 22 and a raised position at which the tool is out of cutting engagement with the material 22.

The machine 10 is controlled by a computer implemented controller 54 which supplies the necessary commands to the machine to operate the X and Y motors 48 and 44, the solenoid 52 and other parts of the machine so that the tool 32 is moved along desired lines of cut relative to the work material positioned at the cutting station 26. The control commands supplied by the controller 54 are generated in response to marker data, indicated schematically at 56, representing a marker describing in terms of X and Y coordinates of points the shape and arrangement of pattern pieces 58 to be cut from the work material. A method and system for producing such marker data is, for example, described in U.S. Pat. No. 3,887,903. The data may be supplied either on line directly to a memory in the controller 54 or may be supplied to the controller pre-recorded on a tape, disc or other data storage medium. In the operation of the machine 10, after a bite of the work material is positioned at the cutting station 26 the cutting tool is moved in the X and Y coordinate directions to cut lines in such bite, such lines usually being the peripheries of desired pattern pieces 58. After the bite is fully cut the cutting operation is interrupted, the drive motor 24 is operated to bring the next succeeding bite of work material to the work station and then the cutting tool 32 is operated again to cut lines in the fresh bite. Such bite-by-bite cutting is continued until all of the pattern pieces defined by the marker data have been cut.

Figure 2:
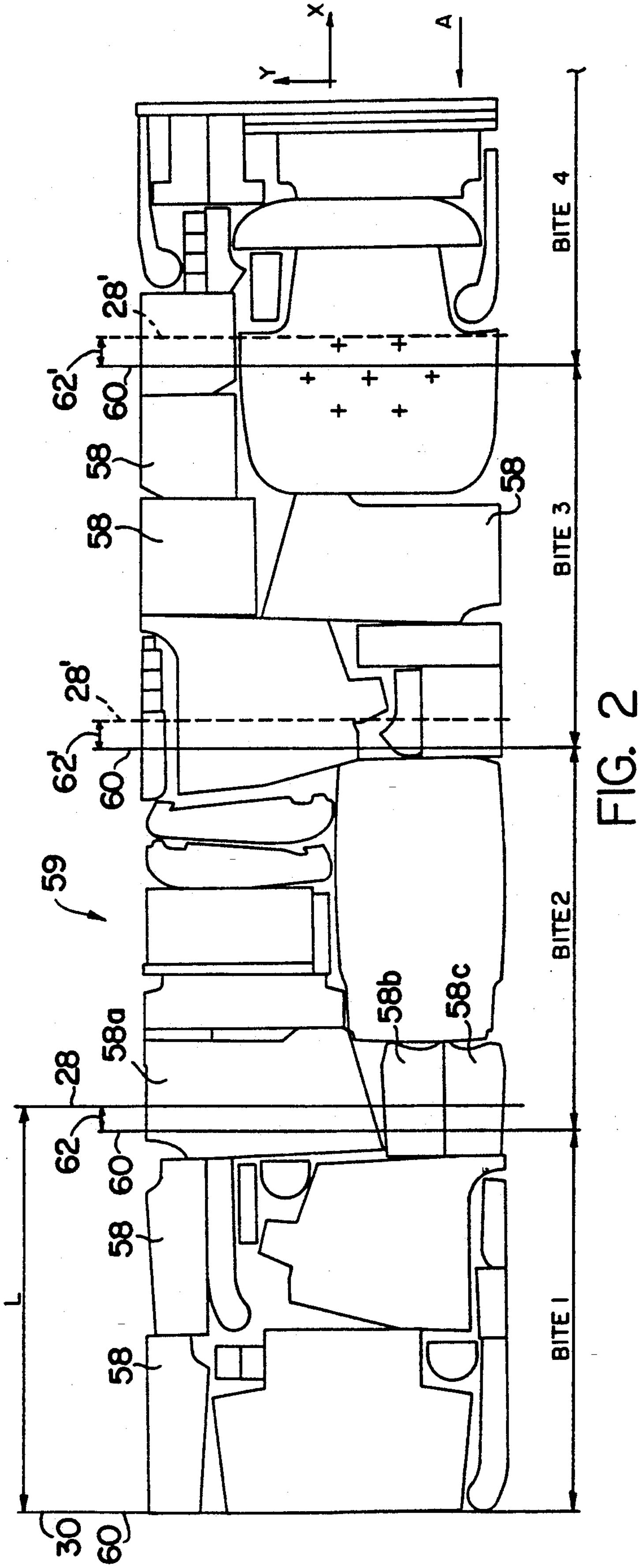
FIG. 2 is a plan view of a marker to be cut by the machine of FIG. 1.

FIG. 2 shows a marker, illustrated generally at 59, such as may in more detail be represented by the marker data 56 of FIG. 1. Referring to this figure, the illustrated marker 59 defines the peripheries of a large number of pattern pieces 58 to be cut from a given length of sheet material or a lay-up of sheets of sheet material. In known ways a given reference point on this marker is registered with a corresponding reference point on the sheet material to be cut so that each point on the marker becomes associated with a corresponding point on the sheet material. In this discussion, a "bite" of sheet material and of the related marker is taken to be a portion of the sheet material 22 and marker 59 having a length, in the X coordinate direction, equal to the distance the sheet material is advanced during each advancement. The direction of this advancement is from right to left as indicated by the arrow A of FIG. 2. In keeping with the broader aspects of the invention the lengths of the bites may vary provided each bite has a length less than the length L of the cutting station 26 as measured between the cutting station boundary lines 28 and 30, however in the illustrated case of FIG. 2 the bites are shown to be of equal length. In FIG. 2 the dividing lines 60 extending transversely of the marker define the boundaries in the X coordinate direction of the bites.

As further shown in FIG. 2, when Bite 1 of the sheet material is located at the cutting station, represented by the full lines 28 and 30 of FIG. 2, the left boundary line 60 of that bite is aligned with the left boundary line 30 of the cutting station. The right boundary line 60 of Bite 1 is, however, spaced to the left of the right boundary line 28 of the cutting station so as to define a bite overlap region 62. The overlap region 62 is one whereat a portion of the next succeeding bite, namely Bite 2, overlaps the cutting station while all of Bite 1 is at the cutting station. More particularly, the sheet material located in the overlap region 62, as shown in FIG. 2, is material which is at the cutting station both at the time illustrated in FIG. 2 and after the sheet material is advanced one bite from the position shown in FIG. 2. Thus, the material in the overlap region may be cut either before or after the advancement. In FIG. 2 the broken lines 28' represent the positions to be taken by the right-hand boundary of the cutting station with respect to the marker following advancements of the sheet material 22 subsequent to the position shown in FIG. 2, and the reference numerals 62' illustrate associated overlap regions which come into play following such subsequent advancements.

With further reference to FIG. 2, it will be noted that the pattern pieces 58 are laid out so that the bite boundary lines 60 pass through some of them. For example, the boundary line 60 dividing Bite 1 from Bite 2 passes through three pattern pieces 58*a*, 58*b* and 58*c*. Therefore, in the case of each of these three pattern pieces it is necessary to split its cutting so that a portion of it is cut while Bite 1 is at the cutting station and to cut another portion of it while Bite 2 is at the cutting station.

Ideally, each bite would have a length equal to the length of the cutting station and all splitting would occur exactly on a boundary line 60. However, and as explained above, under some circumstances split points defined in this manner may be undesirable positions at which to actually make a split because of their closeness to features such as slit notches, V-notches or sharp corners in the associated pattern piece peripheries. In accordance with the invention this situation is rectified by providing an overlap region 62 associated with each boundary line 60 separating two adjacent bites so that split points associated with that boundary line can be made at convenient places within the overlap region instead of exactly on the boundary line.

The lengths of the overlap regions 62, as measured in the X coordinate direction, may vary from marker to marker and possibly from bite to bite in a given marker to suit the sheet material being cut or to suit the complexity of the layout of the pattern pieces in the marker or the complexity of the shape of the pattern pieces themselves. In the illustrated case of FIG. 2, however, the overlap regions of the marker 59 are shown to be of equal length. This length, in FIG. 2 and subsequent figures is exaggerated for purposes of illustration. In actuality, the overlap regions may have lengths as small as ¼ or ½ inch or as large as 6 inches or more. In the discussion which follows the overlap regions 62 of FIG. 2 are taken by way of example to have a length of 4 inches.

Figure 3:
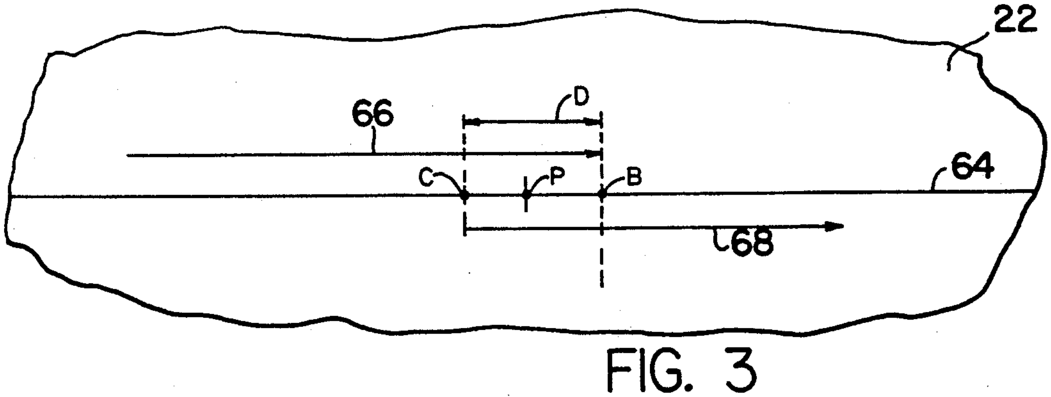
FIG. 3 is an enlarged fragmentary view showing a portion of one of the marker lines of the marker of FIG. 2, transposed to the sheet material to be cut, in the vicinity of the point at which a split is to occur.

Before proceeding with the description of how the locations of split points are determined in accordance with the inventions, it should be noted that to inhibit the possibility of threads or other connecting portions of the sheet material remaining uncut in the area of a split, it is desirable that the cutting motion in the vicinity of a split point be continued a little past the split point and then resumed at position spaced somewhat before the split point. This is illustrated, for example, in FIG. 3 wherein a portion of a marker line is illustrated at 64. Further, this line 64 is one which in accordance with the marker data is to be cut by movement of the cutting tool from left to right in FIG. 3 and is to have a split point at the point P. Therefore, in cutting the line 64 the cutting tool is preferably first moved as indicated by the arrow 66 to a point B spaced some distance beyond of the point P and then, after the material has been advanced to bring a new bite to the cutting station, the cutting is resumed, as indicated by the arrow 68, at a point C located some distance before the point P. Further, as disclosed in U.S. patent application Ser. No. 07/681,555 in ending the cut represented by the arrow 66 and in starting the cut represented by the arrow 68 the cutting tool may be veered to one side or the other of the marker line 64 to assure a definite crossing of the two cutting paths still better assuring the elimination of all uncut threads or other connecting pieces in the vicinity of the split point. In any event, the mode of cutting at a split point illustrated in FIG. 3 includes a cut overlap D, and in accordance with the invention all of this cut overlap is arranged to fall within the associated one of the bite overlap regions 62 of FIG. 2. The amount of cut overlap D required may vary for some sheet materials and therefore is preferably made configurable.

Turning now to the manner in which split points are located within a bite overlap region 62, such points are determined automatically by a computer after the locations of the bite dividing lines 60 and the cutting station boundary lines 28 are defined relative to the marker 59, and such determinations are made for each pattern piece 58 (or other marker line to be cut) extending completely across one of the bite overlap regions 62. By way of example, FIGS. 4 to 9 illustrate the split point locating method of the invention as applied to the pattern piece 58c of FIG. 2, this piece having a periphery defined by a closed marker line 64.

Figure 4:
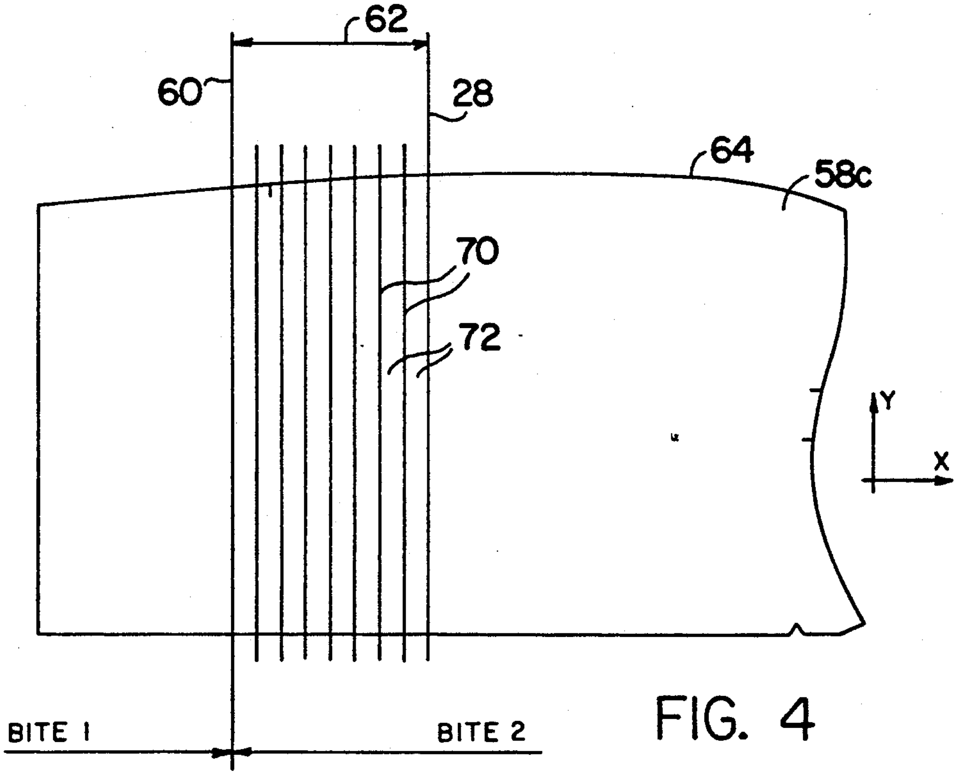
FIG. 4 is a plan view of one of the pattern pieces of FIG. 2 requiring splitting and showing the related bite overlap region divided into a number of transversely extending channels positioned adjacent to one another.

Referring first to FIG. 4, the associated bite overlap region 62 is first divided, by a plurality of channel dividing lines 70 extending in the Y coordinate direction transversely of the marker, into a plurality of transversely extending channels 72. In keeping with the broader aspects of the invention it is enough that the channels 72 be located at various different locations along the length of the overlap region 62. Preferably however, and as illustrated, the channels 72 are of equal length as measured in the X coordinate direction and are located directly adjacent to one another along the length of the overlap region. In FIG. 4 the overlap region 62 is taken to be 4 inches wide with each channel 72 having a width of ½ inch.

Figure 5:
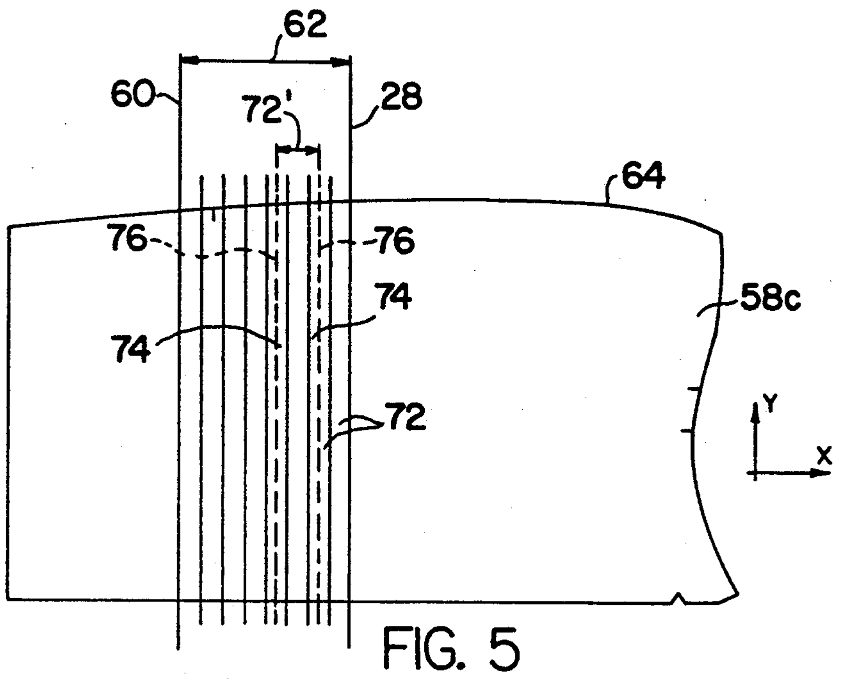
FIG. 5 is a view similar to FIG. 4 but showing the exemplary widening of one channel for line segment counting purposes.

Next, the number of straight line segments making up the marker line 64 and falling into each of the channels 72 is computed to provide a line segment count per channel. For the purposes of making this count, however, and to better avoid or deal with possibly congested areas of the marker line 64, each channel 72 is widened, as illustrated for one channel in FIG. 5 by having a widening zone 74 added to either side of it. That is, as seen in FIG. 5 each channel 72 as so widened is defined by two new boundary lines 76 and has an effective width 72'. The width as measured in the X coordinate direction of each widening zone 74 may vary, but in the illustrated case of FIG. 5 each zone is taken to have a width equal to one half the width of a channel 72 so that each channel as widened for line segment counting purposes has a width double its normal width.

Figure 6:
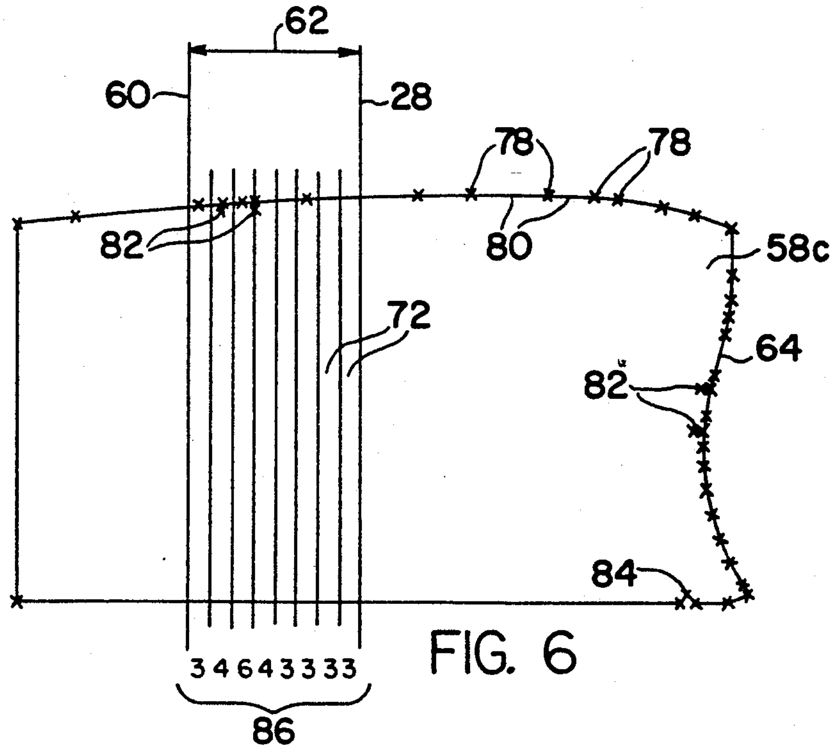
FIG. 6 is a view similar to FIG. 4 but additionally illustrating the line segment count for each channel.

FIG. 6 includes an illustration of the points 78 by which the marker line 64 is represented in the marker data. That is, the line 64 is defined in the marker data by the coordinates of the illustrated points 68 and is comprised of straight line segments 80,80 extending between successive ones of the points 78. Four slit notches 82 are shown in FIG. 6 each consisting of a single straight line segment extending inwardly from the periphery of the pattern piece 58c; and one V-notch 84 is shown consisting of two short straight line segments extending inwardly from the periphery of the pattern piece 58c. FIG. 6 at 86 also indicates the line segment count per channel as made for the illustrated pattern piece 58c.

Figure 7:
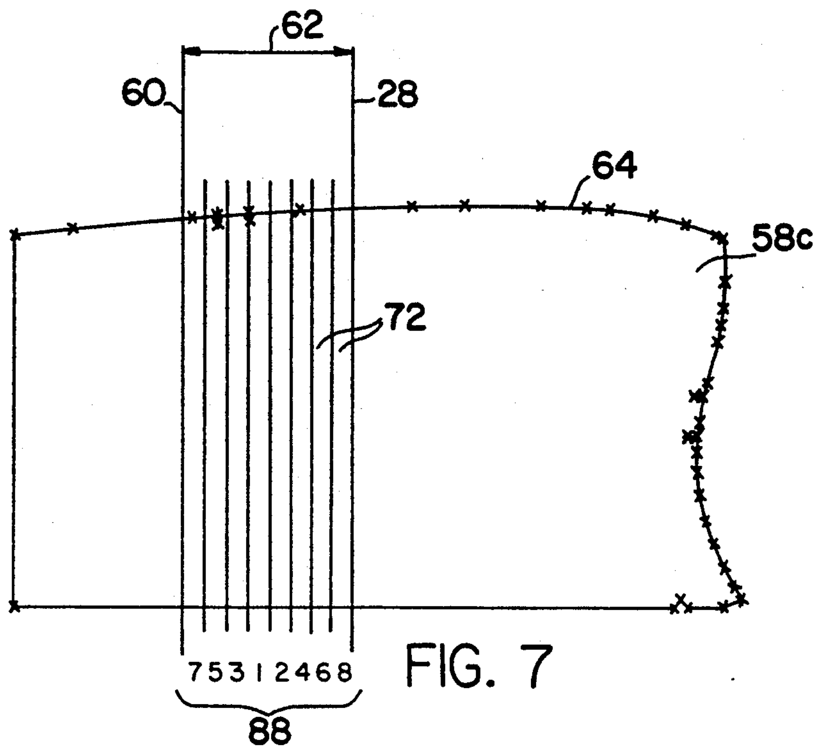
FIG. 7 is a view similar to FIG. 4 further illustrating an order of channel preference.

In further accordance with the invention the split points required for the illustrated pattern piece 58c are now further determined by one of the channels 72 being selected for containing the split points, with the selection being made from among those channels having the lowest line segment count. It may happen that a number of the channels 72 have the same low line segment count, as for example in FIG. 6 where four of the channels have the low count of three. When this occurs the selection is further made on the basis of an order of preference preassigned to the various channels. FIG. 7 at 86 shows such an assignment of preference to the channels 72 wherein the number 1 represents the most preferred channel and the number 8 the least preferred channel. That is, with reference to FIG. 7 the channels 72 with the higher degrees of preference are located in the middle of the overlap region 62 while those with the lower degrees of preference are located at the boundaries of the overlap region 62.

Figure 8:
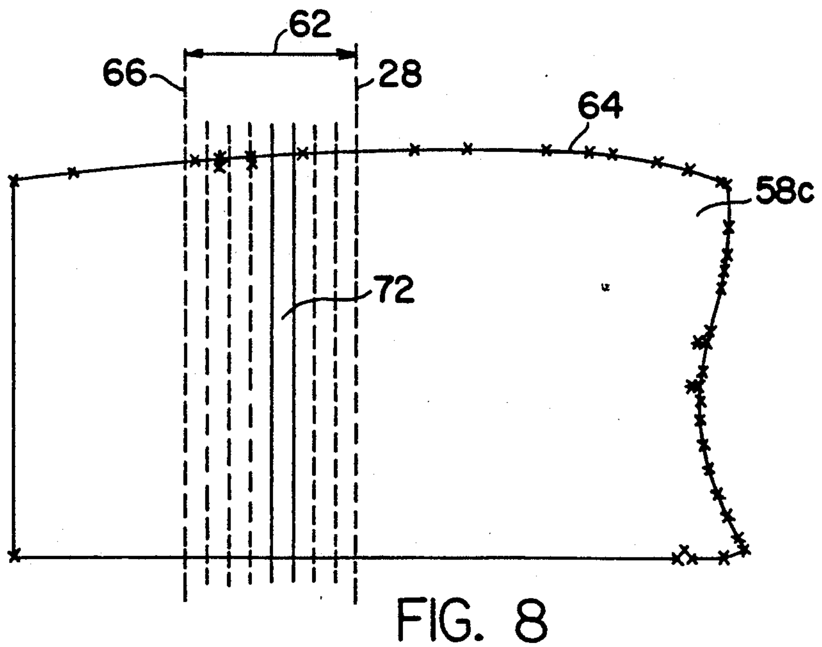
FIG. 8 is a view similar to FIG. 4 showing more clearly the channel selected in accordance with the invention for receiving split points for the illustrated pattern piece.

Therefore, in selecting among the four channels 72 of FIG. 6 having the low line segment count of three by using the order of preference given in FIG. 7 a single channel 72, indicated by the full lines of FIG. 8, is selected for receiving the split points used for splitting the illustrated pattern piece 58c, this one selected channel being the fourth one from the right having a line segment count of three and a number two order of preference.

Having made a channel selection 72, as illustrated in FIG. 8, the straight line segments 80 making us the marker line 62 defining the pattern piece 58c are now divided into two groups, namely those to be cut when Bite 1 is in its entirety at the cutting station and lying essentially to the left of the selected channel 72, and those to be cut when Bite 2 is in its entirety at the cutting station and located essentially to the right of the selected channel 72. Then, as a final step the straight line segments falling into each group are reordered for better cutting efficiency.

Figure 9:
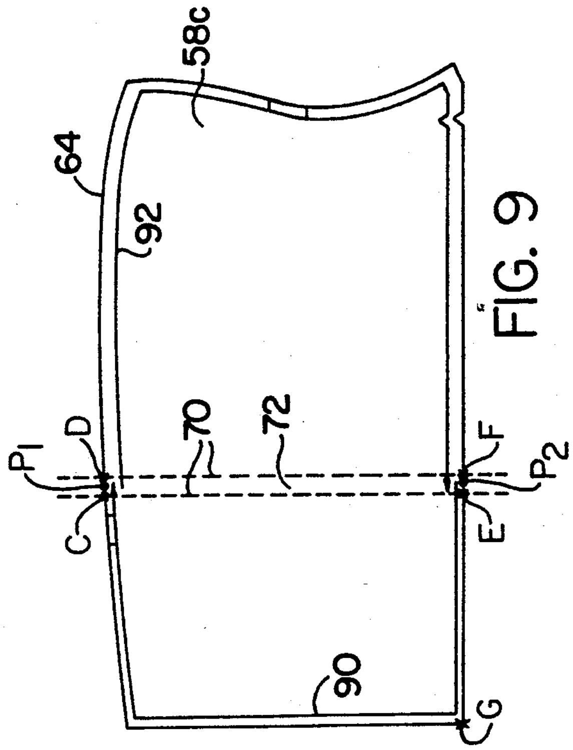
FIG. 9 is a view similar to FIG. 4 showing the manner in which the illustrated pattern piece is cut following the determination of the selected split channel.

Referring to FIG. 9, the points C, D, E and F are points at which the marker line 62 intersects the boundary lines 70 of the selected channel 72. If the illustrated pattern piece 58c of FIG. 9 did not require splitting, the cutting might start for example at the point G, defining the lower left corner of the piece, and travel along the line 62 in the clockwise direction until returning to the starting point G. However, in accordance with the invention, due to the splitting the sequence of cutting the straight line segments making up the marker line 62 is reordered so that the first part of the line 62 is cut by starting at the point F and moving in the clockwise direction to the point D as indicated by the line 90. This occurs while Bite 1 is in its entirety at the cutting station as illustrated in FIG. 2. The cutting tool is then removed from cutting engagement with the work material at the point D and the material is advanced to bring Bite 2 in its entirety to the cutting station. Then the second part of the line 62 of FIG. 9 is cut by starting at the point C and moving clockwise to the point E as indicated by the line 92.

From FIG. 9 it will be appreciated that the illustrated piece 58*c* has two split points. One of these is indicated at $P_1$ and may be taken to fall between the illustrated points C and D. The other is indicated at $P_2$ and falls between the indicated points E and F. The illustrated mode of cutting further, it will be understood, provides for cut overlap of the type illustrated in FIG. 3 for each of the split points $P_1$ and $P_2$ of FIG. 9.

In the method of determining split points described above in connection with FIGS. 4 to 9 for the illustrated pattern piece 58*c* the marker line 62 defining the pattern piece 58*c* crosses the involved overlap region 62 two times, and in making a channel selection for split point locating purposes the two crossings are dealt with in common so that only one channel 72 is selected which is used for both of the required splits. This common handling of both of the crossings is not however necessary and if desired each crossing by the marker line 64 of the overlap region 62 may be dealt with individually so that possibly different channels 72 may be selected for containing the two split points of the two crossings. Such method is illustrated in FIG. 10.

Figure 10:
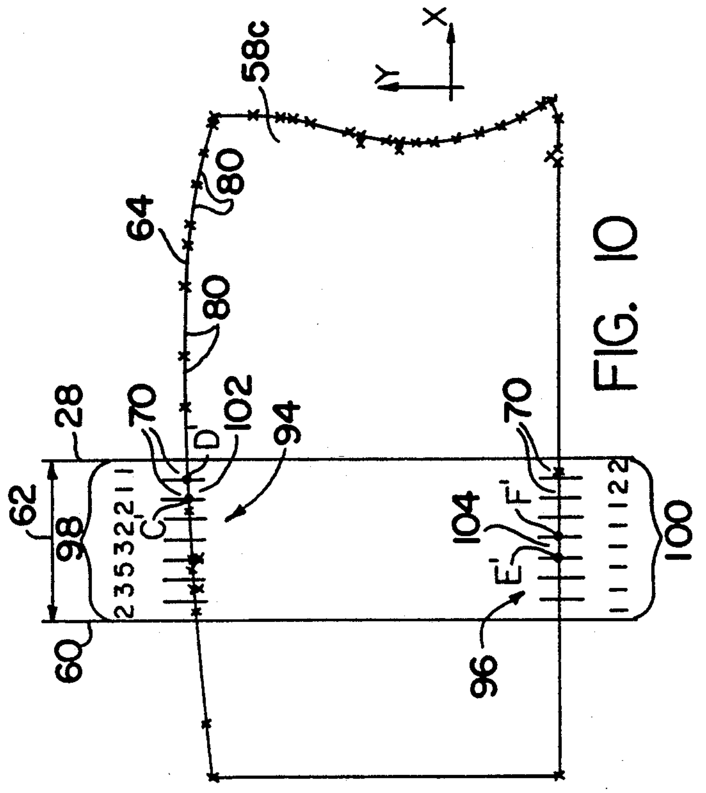
FIG. 10 is a view similar to FIGS. 6 and 9 illustrating another embodiment of the invention wherein each crossing of the overlap region by the illustrated marker line is dealt with independently in regard to the selection of channels to which split points are assigned.

Referring to FIG. 10, the illustrated channels 70 in their order of preference are the same as those of FIGS. 4 and 7. The marker line 64 crosses the overlap region 62 two times, one of these times being indicated generally at 94 and the other at 96, and the number of straight line segments included in each channel 70 (as widened for counting purposes in accordance with FIG. 5) is separately counted for each crossing 94 and 96. The line segment count per channel for the crossing 94 is indicated at 98 and the line segment count per channel for the crossing 96 is indicated at 100. Then on the basis of the line segment count per channel and the assigned channel order of preference one channel 70 is selected for the crossing 94, this selected channel being the one indicated at 102. Similarly, a channel 70 is also selected for the crossing 96, this selected channel being the one indicated at 104. Then again the line segments 80 making up the marker line 64 are divided into two groups and their cutting sequence reordered so that in the cutting of the marker line 64 of FIG. 10 the cutting starts at the point F′ and continues clockwise from there to the point D′ and then, after a material advancement, begins again at the point C′ and continues clockwise from there to the point E′.

Figure 11:
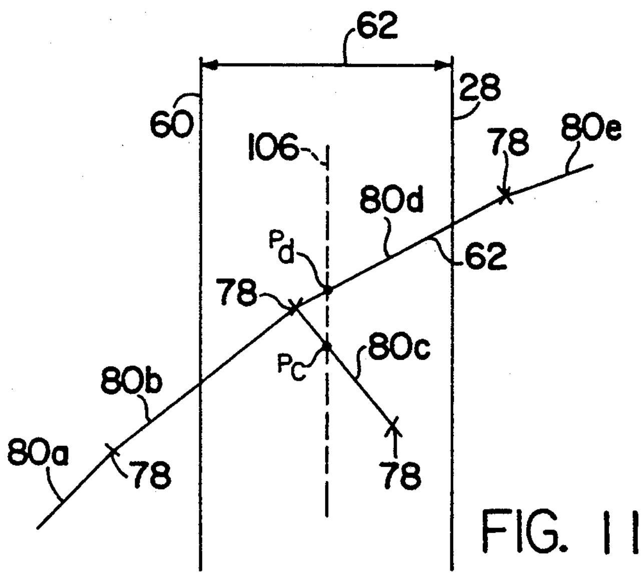
FIG. 11 is a view similar to FIG. 3 illustrating the splitting of a marker line including a "dead end" cut path.

As a final point it should be noted that when splitting a marker line, so-called "dead end" pass which may be included in such marker line may be problematical if located near to a split point. Any cut path that extends away from the general perimeter of the pattern piece 58 defined by the marker line is considered a "dead end" path. For example, the slit notch shown in FIG. 11 is a good example. In this figure the portion of the marker line 62 illustrated is comprised of the straight line segments 80*a*, 80*b*, 80*c*, 80*d* and 80*e* with the segment 80*c* representing a slit notch and a "dead end" path. The line 106 is a line determined by the above-described method on which a split point for the line 62 is to be located within the associated bite overlap region 62. However, it will be noted that this line 106 intersects the marker line two times to define two possible split points Pc and Pd. If the point Pc located on the line segment 80*c* is selected as the split point, undesirable results may occur. To prevent this from happening, possible split points located along dead end paths, such as represented by the segment 80*c* of FIG. 11, should be ignored and preference given to alternate locations located on the perimeter of the pattern piece. Therefore, in the situation of FIG. 11 the point Pc should be ignored and the point Pd used as the split point.

I claim:

1. A process for determining the location at which the splitting of a marker line extending from one bite to an adjacent bite of sheet material is to occur for the purpose of cutting the line in sheet material in a cutting process wherein the sheet material is cut bite by bite by an X-Y cutter at a cutting station having a given length in a length direction, and wherein the sheet material is intermittently advanced to said cutting station in said length direction with the distance said material is advanced during each advancement being smaller than said given length of said cutting station s that between successive advancements the material then residing at the cutting station includes an overlap region which will also be at the cutting station after the next advancement, said process comprising:

providing marker data representing a marker to be cut from said sheet material and having a length longer than that of said cutting station and whereby the marker lines to be cut consist of successive straight line segments extending between end points defined by said marker data, inspecting said marker data to identify a marker line passing through said overlap region of said sheet material, dividing said overlap region into a plurality of channels located at various places along the length of said overlap region and extending transversely of said length direction, determining the number of said straight line segments of said identified marker line contained at least in part in each of said channels to provide a line segment count for each channel, on the basis of said line segment count per channel selecting one of said channels, and assigning the splitting of said identified marker line to the portion thereof passing through said one selected channel.

2. The process of claim 1 wherein said step of selecting one of said channels is carried out by selecting a channel having the lowest obtained line segment count.

3. The process of claim 2 further characterized by assigning said channels an order of preference, and in a case where two or more of said channels have the same lowest obtained line segment count said step of selecting one of said channels being carried out by selecting that channel having the higher or highest degree of preference according to said order of preference from among those channels having said same lowest obtained line segment count.

4. The process of claim 3 further characterized by said step of assigning said channels an order of preference being carried out by assigning the highest degrees of preference to those channels located at the middle of said overlap region and by assigning the lowest degrees of preference to those channels located at the boundaries of said overlap region.

5. The process of claim 1 further characterized by each of said channels for the purpose of said step of determining the number of said straight line segments of said identified marker line contained at least in part in each of said channels being widened by adding to it two widening zones each located adjacent a respective one of its boundaries.

6. The process of claim 1 further characterized by said channels being of equal width as measured parallel to said length direction and being arranged adjacent to one another.

7. The process of claim 6 further characterized by each of said channels for the purpose of said step of determining the number of said straight line segments of said identified marker line contained at least in part in each of said channels being widened by adding to it two widening zones each located adjacent a respective one of its boundaries.

8. The process of claim 7 further characterized by said two widening strips added to each channel being of equal width and said two widening strips added to one channel being of the same width as those added to the other of said channels.

9. The process of claim 1 further characterized by said identified marker line being one defining the closed periphery of a pattern piece and crossing said overlap region at least two times, said step of determining the number of said straight line segments of said identified marker line contained at least in part in each of said channels to provide a line segment count for each channel being carried out by determining the total number of said straight line segments of said identified marker line contained at least in part in each of said channels for all of the times said identified line crosses the channel, and said step of assigning the splitting of said identified marker line to the portion thereof passing through said one selected channel being carried out by assigning the splitting of said marker line for each of its crossings of said overlap region to the portion thereof passing through said one selected channel.

10. The process of claim 1 further characterized by said identified marker line being one defining the closed periphery of a pattern piece and crossing said overlap region at least two times, said step of determining the number of said straight line segments of said identified marker line contained at least in part in each of said channels, said step of selecting one of said channels on the basis of said line segment count per channel, and said step of assigning the splitting of said identified marker line to the portion thereof passing through said one selected channel being carried out individually for each of said crossings of said overlap region by said marker line whereby each crossing of said overlap region by said identified line may possibly have assigned to it for splitting purposes a selected one of said channels different form the one or ones assigned to the other one or more crossings of said overlap region by said identified line.

11. A process for bite-by-bite two-dimensional cutting of sheet material, said process comprising:

providing means defining a cutting station having a given length in a length direction, providing marker data representing a marker to be cut from said sheet material and having a length longer than that of said cutting station and whereby the marker lines to be cut consist of successive straight line segments extending between end points defined by said marker data, intermittently advancing sheet material to be cut in accordance with said marker data to said cutting station to successively bring different successive portions of said sheet material to said cutting station with distance of said material is advanced during each advancement being smaller than said given length of said cutting station so that the given portion of said sheet material residing at the cutting station between any two advancements includes an overlap region which will also be included in the next portion of said sheet material residing at said cutting station after the next advancement, inspecting said marker data to identify a marker line contained in part in said given portion of said sheet material and in part in said next portion of said sheet material and passing through said overlap region, dividing said overlap region through which said identified line passes into a plurality of channels located at various places along the length of said overlap region and extending transversely of said length direction, determining the number of segments of said identified marker line contained at least in part in said channels to provide a line segment count for each channel, on the basis of said line channel count selecting one of said channels, cutting in said sheet material while said given portion thereof is at said cutting station that part of said given line located on one side of said selected channel, and cutting in said sheet material while said next portion thereof is at said cutting station that part of said given line located on the other side of said selected channel.

12. The process of claim 11 wherein said step of selecting one of said channels is carried out by selecting a channel having the lowest obtained line segment count.

13. The process of claim 11 further characterized by each of said channels for the purpose of said step of determining the number of said straight line segments of said identified marker line contained at least in part in each of said channels being widened by adding to it two widening zones each located adjacent a respective one of its boundaries.

14. The process of claim 11 further characterized by said identified marker line being one defining the closed periphery of a pattern piece and crossing said overlap region at least two times, said step of determining the number of said straight line segments of said identified marker line contained at least in part in each of said channels to provide a line segment count for each channel being carried out by determining the total number of said straight line segments of said identified marker line contained at least in part in each of said channels for all of the times said identified line crosses the channel, and said step of assigning the splitting of said identified marker line to the portion thereof passing through said one selected channel being carried out by assigning the splitting of said marker line for each of its crossings of said overlap region to the portion thereof passing through said one selected channel.

15. The process of claim 11 further characterized by identified marker line being one defining the closed periphery of a pattern piece and crossing said overlap region at least two times, said step of determining the number of said straight line segments of said identified marker line contained at least in part in each of said channels, said step of selecting one of said channels on the basis of said line segment count per channel, and said step of assigning the splitting of said identified marker line to the portion thereof passing through said one selected channel being carried out individually for each of said crossings of said overlap region by said marker line whereby each crossing of said overlap region by said identified line may possibly have assigned to it for splitting purposes a selected one of said channels different form the one or ones assigned to the other one or more crossings of said overlap region by said identified line.

* * * * *